United States Patent [19]

Ewer et al.

[11] Patent Number: 5,454,148
[45] Date of Patent: Oct. 3, 1995

[54] TOMBSTONE FIXTURE

[75] Inventors: Glen A. Ewer, New Berlin; Matthew R. Soik, Muskego, both of Wis.

[73] Assignee: Johnson Service Company, Milwaukee, Wis.

[21] Appl. No.: 160,592

[22] Filed: Dec. 1, 1993

[51] Int. Cl.⁶ .................................................. B23Q 3/02
[52] U.S. Cl. .............................. 29/33 J; 269/63; 408/71; 409/218
[58] Field of Search ........................ 29/33 P, 563, 29/38 A, 38 B, 38 C, 33 J; 409/161, 221, 218; 408/13, 71; 269/63; 451/401

[56] References Cited

U.S. PATENT DOCUMENTS

| | | | |
|---|---|---|---|
| 2,953,069 | 9/1960 | Smith | 29/38 C X |
| 3,740,806 | 6/1973 | Witzigi et al. | 29/38 C |
| 4,425,530 | 4/1984 | Kindl et al. | 409/218 X |
| 4,440,530 | 4/1984 | Yamakaye | 408/13 X |
| 5,243,745 | 9/1993 | Varnau | 29/33 P |

FOREIGN PATENT DOCUMENTS 1221522  7/1966  Germany .................................. 269/63

Primary Examiner—Z. R. Bilinsky
Attorney, Agent, or Firm—Foley & Lardner

[57] ABSTRACT

A tombstone style machine tool fixture for machining valve castings having hexagonal flanges on each end and a bonnet intermediate the ends of the castings, the fixture including a column having a number of work stations mounted on the column, each work station including a main support plate, a number of hydraulic cylinder assemblies mounted on said support plate, a clamp plate supported by said hydraulic cylinder assembly for movement between open and closed positions with respect to the main support plate, a locating plate removably mounted on said clamp plate and having a hexagonal notched block mounted on each end of the locating plate for engaging the flanges on the casting and an alignment block mounted on said locating plate intermediate said notched blocks to align the casting in the notched block and a clamp bar mounted on said column for seating the flanges in said notched blocks.

13 Claims, 5 Drawing Sheets

TOMBSTONE FIXTURE

FIELD OF THE INVENTION

The present invention relates to a tombstone fixture and more particularly to a work station for machining two or three way valve castings.

BACKGROUND OF THE INVENTION

Valve castings of the type described herein must be machined to finish the casting. Typically, a number of such castings are affixed to a fixture with three of the openings in the casting positioned to be machined. Each opening is machined and the casting is released from the fixture and reset to machine each of the openings in the casting. This is a time consuming procedure particularly when small numbers of castings are to be machined.

SUMMARY OF THE PRESENT INVENTION

Tombstone fixtures of the type contemplated are mounted in pairs on a pivotal support assembly. Each fixture including four columns or panels with two work stations generally provided on each panel. One valve casting is supported in each work station. The support assembly is initially positioned with one fixture in a cabinet for machining the castings and the other fixture located in a set up location. The fixture in the cabinet is rotated into alignment with the machine tools in sequence until the fixture has been rotated 360°. During the time that the valve castings are being machined, the other fixture is being unloaded and reloaded with valve castings which may or may not be of the same size. If the casting is of a different size, then the work station must be interchanged to accommodate the change in size of the casting.

Each tombstone fixture includes a number of work stations mounted on the columns or panels which allow multiple work pieces to be fixtured and presented for machining. Each of the individual work stations includes a main plate having a clamping plate mounted thereon and a locating plate having a T slot for engaging the clamping plate, the locating plate being aligned on the clamping plate and drawn into engagement with the upper surface of the main plate to establish a primary plane for the work station.

One of the features of the invention is the provision of unique centering cone assemblies provided on the main plate which cooperate with corresponding recesses in the locating plate to accurately align the locating plate on the main plate.

Another feature of the invention is the formation of a nest on the top of the locating plate for supporting the valve casting. Each nest includes a pair of end blocks mounted on the locating plate and a centering block. The flanges on each end of the casting being seated in the end blocks with the bonnet end of the casting aligned in the centering block. With this arrangement any combination of end blocks with a locator block mounted between the end blocks can be mounted on the locating plate.

One of the primary advantages of the invention is that the set up time is reduced sufficiently to be completed within the machining time cycle when used on a multiple fixture machine.

A further advantage is a reduction in the cost which is far less than the cost of other functionally comparable methods.

More particularly, the centering block is spring loaded and linearly guided to accurately align the valve casting in the end blocks when a clamping force is applied to seat the casting in the end blocks. The centering block moves in the direction of the force until the casting is in full contact with the end blocks. In this particular design the valve castings rest on the end blocks external to the centering block. This allows for the use of one set of end blocks with various centering blocks. Machining of the ends of the valve casting is accomplished with minimal part distortion of the casting. The clamping forces required are less to maintain the parts in position. This is particularly true for machining on multiple sides of prismatic parts.

Another feature of this invention is the provision of a spring loaded tool touch off probe which is utilized to measure machine tool and cutting tool offsets. This unique concept presents both planar and linear contacts perpendicular to the spindle axis. Tools such as drills can have their single end point automatically measured in the offsets by touching off the planar surface. Taps and other similar tools can be touched off either against the planar surface or the linear blade type end of the probe stylus. The use of the linear blade type side of the probe stylus reduces the contact area of the tool to a minimum, thus reducing the likelihood of chips or contamination from causing an error in the tool length reading. More importantly, for machine tools equipped with electrical contact signal probing, the reduced touch off contact area increases the repeatability and, therefore, properly calibrates the accuracy of measurement.

Other principal features and advantages of the invention will become apparent to those skilled in the art upon review of the following drawings, the detailed description and the appended claims.

Figure 1:
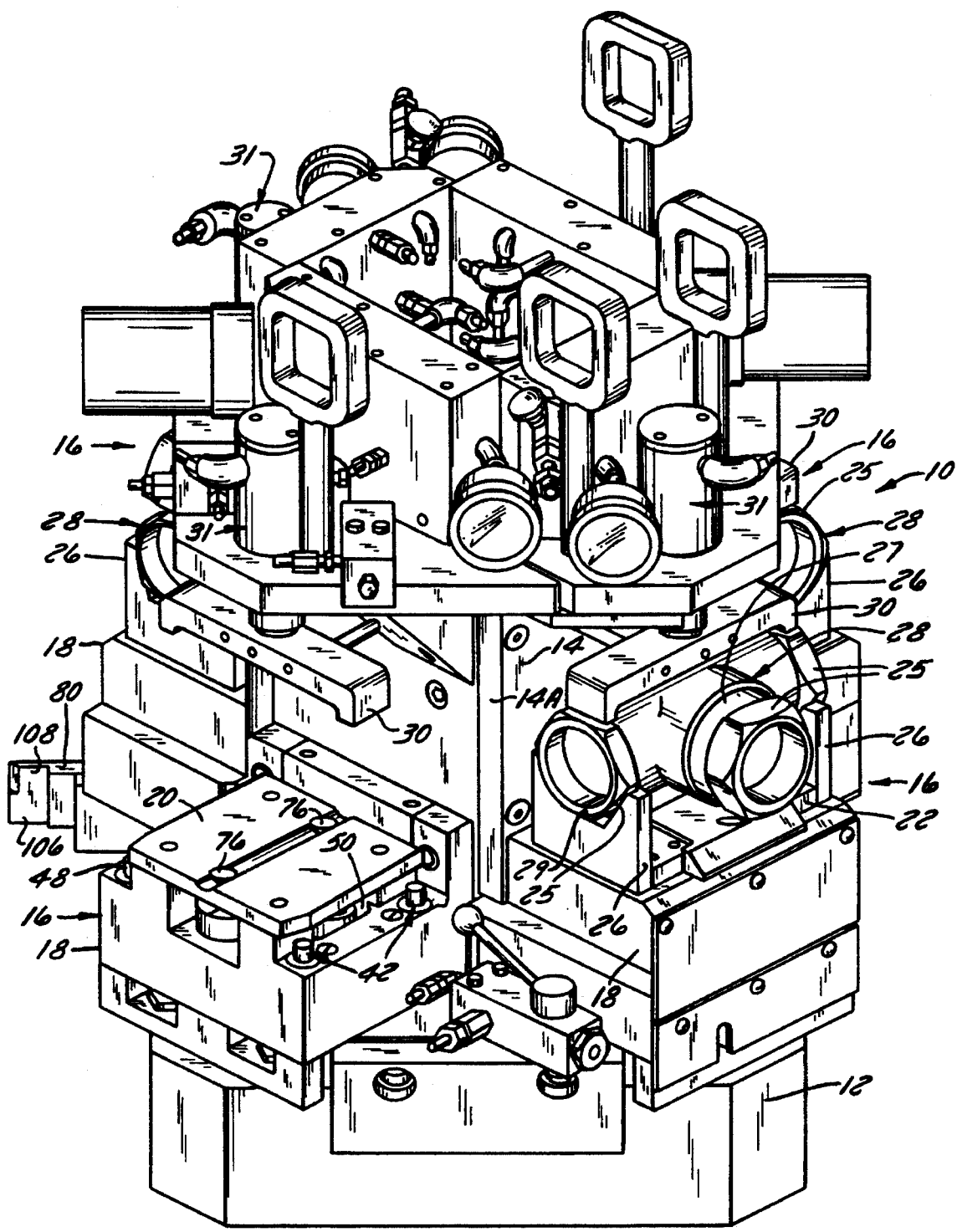
FIG. 1 is a perspective view of a tombstone fixture having a single work station on each side panel.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Figure 3:
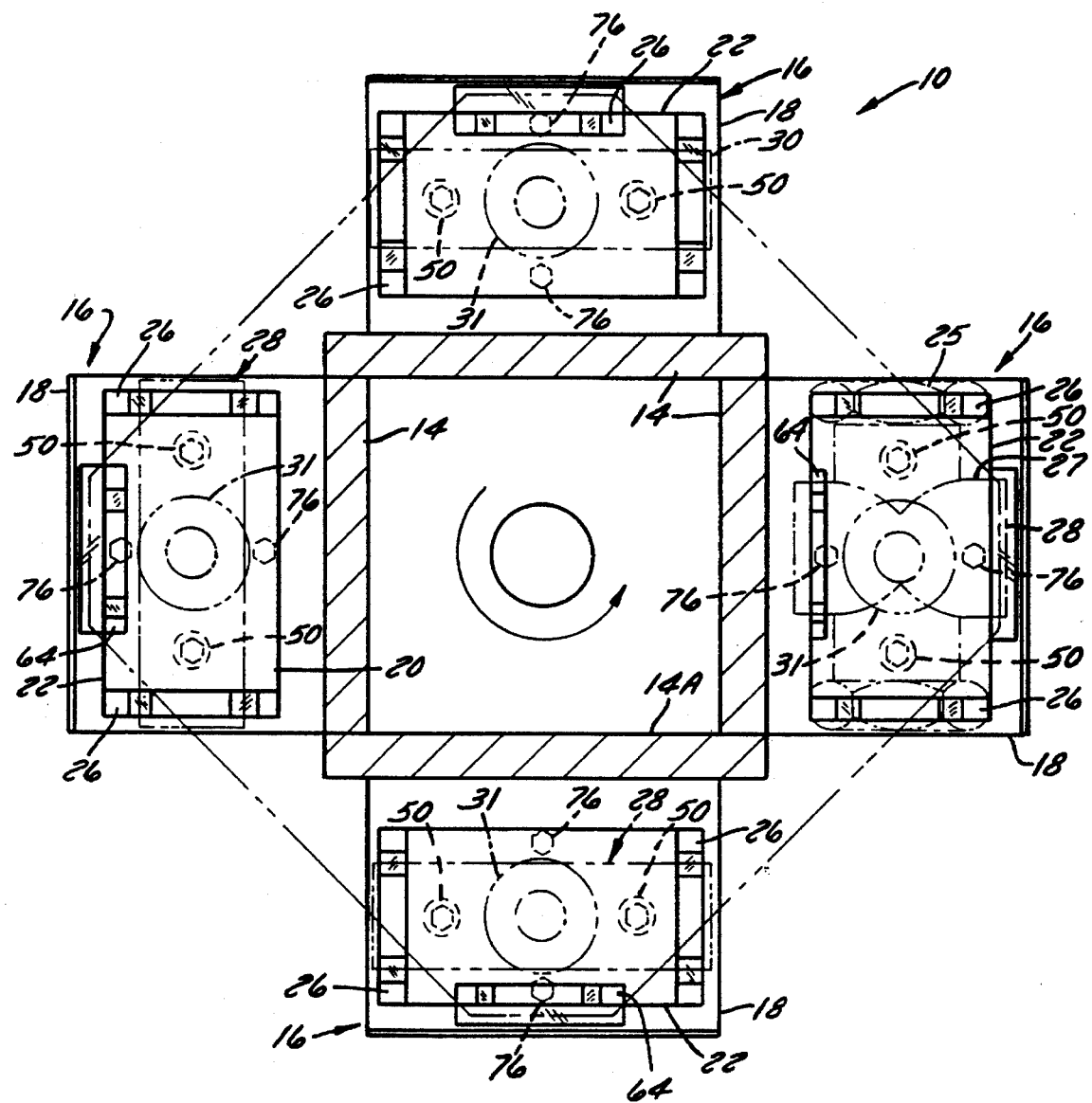
FIG. 3 is a top view of the tombstone fixture.

The tombstone fixture 10 according to the present invention is used to support a number of valve castings 28 in a finishing machine (not shown). The valve castings 28 are provided with a hexagonal flange 25 on each end and a bonnet 27 intermediate the ends thereof. The fixture 10 as shown in FIG. 3 generally includes a base plate 12 having a number of side wall plates 14 mounted on the base plate to form a square column 15. One of the plates 14A being removable for service of the fixture as described hereinafter. One or more work stations 16 are provided on the outer surface of each of the plates 14.

Figure 2:
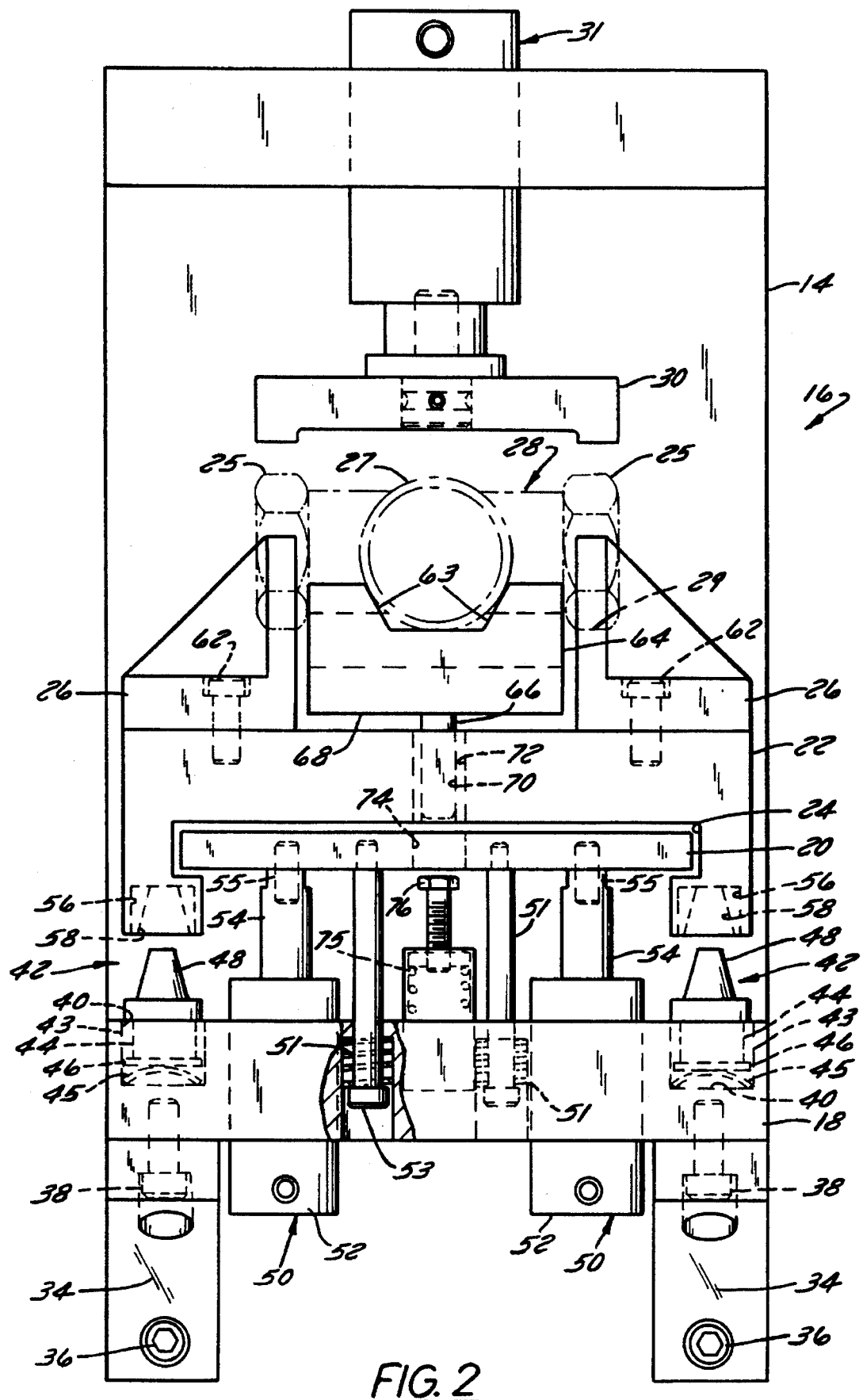
FIG. 2 is a schematic view of the front of the work station.

In this regard each station 16, FIG. 2, includes a main plate 18 mounted on the face of one of the plates 14, a clamp plate 20 and a locating plate 22 removably mounted on the clamp plate 20. The clamp plate 20 is mounted on the main plate 18 for movement between open and closed positions with respect to the main plate 18. The locating plate 22 includes a T slot 24. The locating plate 22 is mounted on the clamp plate 20 by aligning the T slot 24 with the clamp plate 20 and sliding the locating plate 22 onto the clamp plate 20.

Referring to FIG. 2, a pair of end blocks 26 are removably mounted on each end of the locating plate 22 for supporting the hexagonal flanges 25 of the valve casting 28. A centering or alignment block 64 having a V groove 63 is mounted on the locating plate 22 between the end blocks 26 in a position to engage the bonnet 27 on the valve casting 28. The flanges 25 of the valve casting 28 are initially aligned in the slots 29 as shown in FIG. 1 in the end blocks 26 with the circular flange 27 aligned with V groove 63 in the centering block 64. A clamp bar 30 is moved downward by a hydraulic piston and cylinder assembly 31 into engagement with the flanges 25 on the valve casting 28 to seat the flanges 25 in the end blocks. The bonnet 27 is aligned with the V groove 63 in the end block 26. If the bonnet 27 is misaligned with the V groove 63, the casting will move axially to center the valve casting in the end blocks.

Referring to FIG. 2 a schematic drawing is shown of the parts of one of the work stations 16. In this regard the main plate 18 is shown supported on one of the plates 14 by means of gussets 34 which are secured to the plate 14 by screws 36 and to the plate 18 by screws 38. The main plate 18 includes a blind bore 40 in each corner for housing a male centering cone assembly 42. Each assembly 42 includes a shaft 44 having a shoulder 46 at the lower end and a male cone 48 at the upper end. A belville washer 45 is positioned in the bore 40 beneath shaft 44. The shaft 44 is retained in the bore 40 by means of a bushing 43 provided at the upper end of bore 40.

A blind bore 56 is provided in each corner of the locating plate 22. A female cone 58 is seated in each of the blind bores 56 to matingly engage the male cone 48. With this arrangement the locating plate 22 will be centered precisely on the main plate 18 when seated on the main plate 18.

The clamp plate 20 is biased into engagement with the main plate 18 by means of springs 51 mounted on the ends of bolts 53. Hydraulic piston and cylinder assemblies 50 are provided to elevate the clamp plate 20. Each cylinder assembly 50 includes a cylinder 52 mounted in the main plate 18 and a piston 54 which is connected to the clamp plate 20 by means of a threaded rod 55 which is threaded into the end of piston 54 in the bottom of clamp plate 20.

Figure 4:
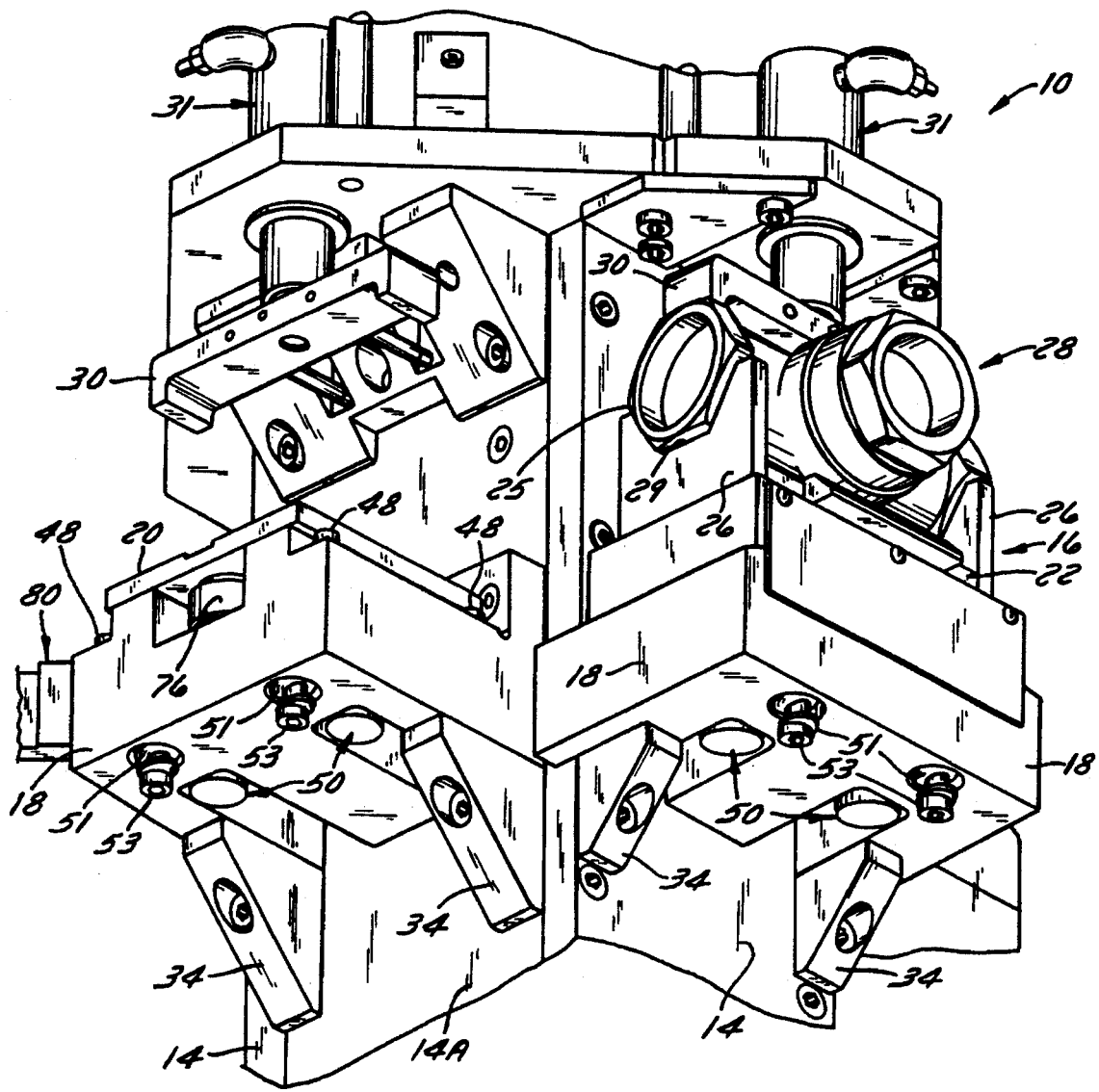
FIG. 4 is a perspective view of the bottom of the work station.
Figure 5:
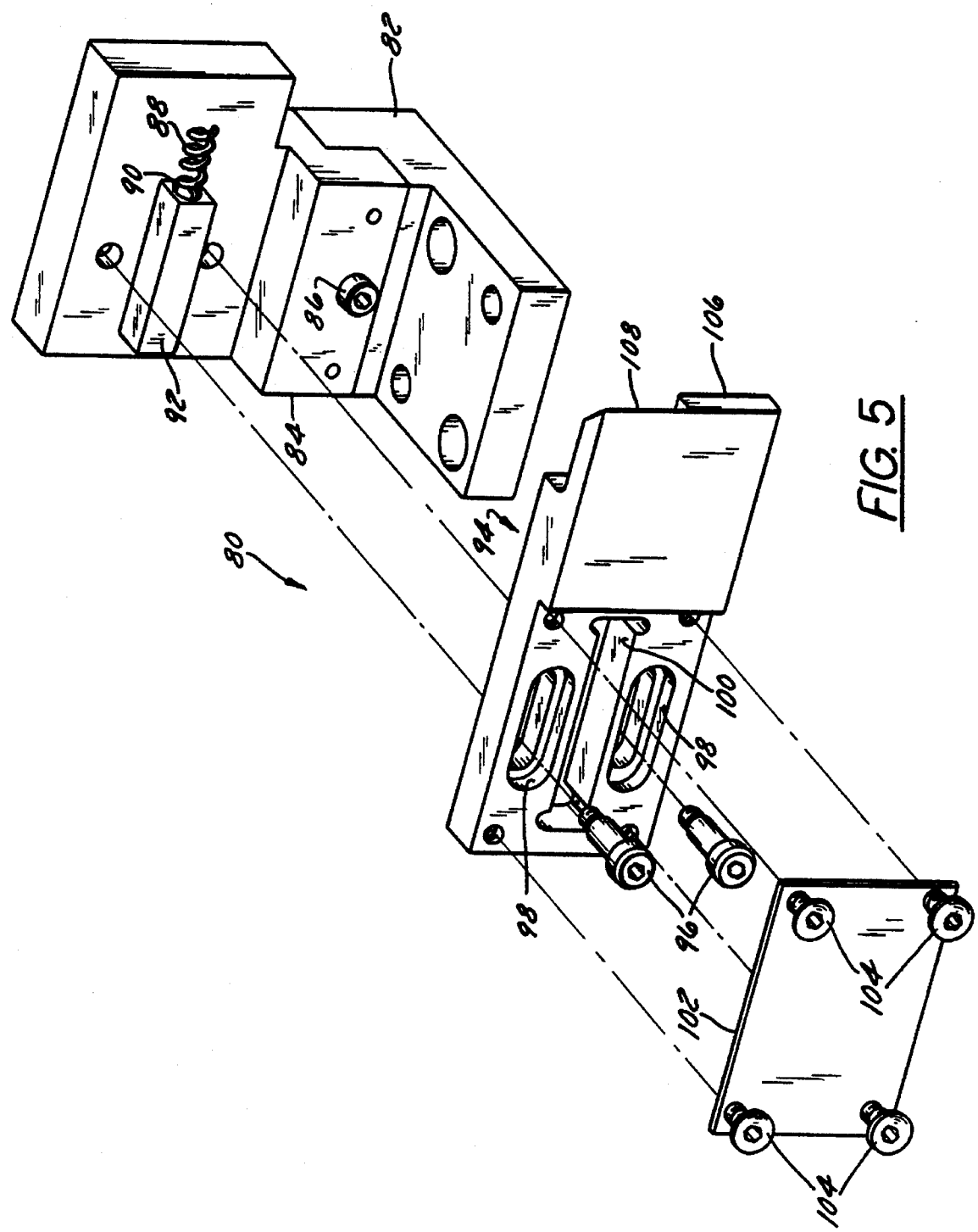
FIG. 5 is an exploded view of the touch off probe.

The end blocks 26 are secured to the upper surface of the locating plate 22 by means of a pair of bolts 62. The end blocks 26 as shown in FIGS. 1 and 4 matingly engage the flanges 25 on the ends of valve casting 28. The valve casting 28 is centered between the end blocks 26 by means of the centering block 64 which is aligned on the locating plate 22 by means of pins or rods 66 which are press fit into the base 68 of the centering block 64. The rods 66 are aligned in bushings 70 which are located in holes 72 in the locating plate 22.

The clamp plate 20 is provided with a corresponding number of holes 74 which are aligned with the holes 72 in the locating plate 22. A pair of steady rest pins 76 are mounted in the main plate 18 in alignment with each of the holes 74 for engaging the ends of rods 66. The steady rest pins 76 are biased by springs 75 to provide an upward bias force against pins 66 to allow the guide block to float on the clamp plate. The pins 76 are hydraulically locked in position to maintain the bias force against the guide block 64. When the locating plate 22 is seated on the main plate 18 the steady rests 76 will pass through the openings 74 in the clamp plate to engage the end of the rods 66. The centering block 64 is thereby biased into engagement with the flange 27 on the casting 28 as the flanges 25 are clamped in the end blocks.

A spring loaded tool touch off probe assembly 80 is mounted on the base 12 to measure machine tool and cutting offsets. The probe assembly 80 generally includes a mounting plate 82 and a support block 84 secured to the plate 82 by a screw 86. A spring 88 is positioned in a hole 90 provided in a ledge 92 provided on the side of block 84. A probe 94 is mounted on the side of the support block 84 by a pair of bolts 96 aligned with slots 98 in the side of the probe. The ledge 92 and spring 88 are aligned with a slot 100 to bias the probe 94 outwardly from the base 12. The slots 98 and 100 are covered by a plate 102 secured to the side of the probe by screws 104. The probe 94 is provided with a planar contact surface 106 and a linear contact surface 108 which are located perpendicular to the spindle axis. Tools such as drills can be automatically measured by touching off the planar surface 106. Taps can be touched off against either the planar surface 106 or the blade contact surface 108.

Thus, it should be apparent that there has been provided in accordance with the present invention a tombstone fixture that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A tombstone style machine tool fixture for machining valve castings having a hexagonal flanges on each end and a bonnet intermediate the ends thereof comprising a column, a number of work stations mounted on said column, each work station including a main support plate, a number of hydraulic cylinder assemblies mounted on said support plate, a clamp plate supported by said hydraulic cylinder assemblies, a locating plate removably mounted on said clamp plate, a hexagonal notched block mounted on each end of said locating plate for engaging the flanges on each end of the casting, an alignment block mounted on said locating plate intermediate said notched blocks, means for positively aligning said locating plate on said main plate, and a clamp bar mounted on said assembly for seating the work piece in said notched blocks.

2. The tombstone fixture according to claim 1 wherein said aligning means comprises a number of conical locator pins mounted on said main plate and a corresponding number of conical openings in said locating plate.

3. The tombstone fixture according to claim 1 including means for biasing said alignment block into engagement with said bonnet for centering said casting in said notched blocks.

4. The tombstone fixture according to claim 1 wherein said locating plate can be removed from said main plate and replaced by another locating plate which is arranged to support a different valve casting.

5. A work station for securing a valve casting to a tombstone machine tool, said station comprising:

a main support plate mounted on said machine tool, a clamp plate mounted for movement between operative and inoperative positions with respect to said main support plate, and a locating plate assembly removably mounted on said clamp plate, said assembly including a locating plate, a pair of notched blocks mounted in a spaced relation on said locating plate for supporting the ends of the valve casting, a V block assembly mounted on said locating plate intermediate the notched blocks for centering the casting in the notched blocks, and a clamp bar assembly for seating the casting in the notched blocks.

6. The work station according to claim 5 including means for biasing said V block assembly into engagement with said casting.

7. The work station according to claim 6 including means for biasing said clamp plate into engagement with said main support plate and means for centering said locating plate on said main plate.

8. The work station according to claim 7 including means mounted on said work station for measuring machine tool and cutting offsets.

9. A tombstone fixture for machining valve castings having a main body with a flange at each end and a bonnet intermediate the ends thereof, said fixture comprising:

a square column having one or more work stations mounted on each side of the column, each work station including, a main plate mounted on said column, a clamp plate mounted on said main plate, a locating plate removably mounted on said clamp plate, means for supporting the valve castings on said locating plate, and a clamp bar mounted on said column for clamping the valve casting to said supporting means.

10. The fixture according to claim 9 wherein said supporting means includes a pair of end blocks mounted on said locating plate for supporting the flanges on the valve casting and a centering block having a V shaped opening mounted on said locating plate for engaging said bonnet to align said flanges in said end blocks.

11. The fixture according to claim 10 including means for biasing said centering block into engagement with the valve bonnet.

12. The fixture according to claim 9 wherein said column is formed by four panels, one of which can be removed for servicing the hydraulic system.

13. The fixture according to claim 9 including a tool touch off probe assembly mounted on said fixture for measuring machine tool and cutting offsets.

* * * * *